(12) United States Patent
Kuang

(10) Patent No.: US 12,532,231 B2
(45) Date of Patent: Jan. 20, 2026

(54) CELL DATA TRANSMISSION METHOD AND APPARATUS AND ELECTRONIC DEVICE

(71) Applicant: VIVO MOBILE COMMUNICATION CO., LTD., Dongguan (CN)

(72) Inventor: Yunsheng Kuang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 342 days.

(21) Appl. No.: 18/238,448

(22) Filed: Aug. 25, 2023

(65) Prior Publication Data

US 2023/0403612 A1 Dec. 14, 2023

Related U.S. Application Data

(63) Continuation of application No. PCT/CN2022/076963, filed on Feb. 18, 2022.

(30) Foreign Application Priority Data

Feb. 26, 2021 (CN) .......................... 202110219300.9

(51) Int. Cl.
*H04W 36/00* (2009.01)
*H04W 36/08* (2009.01)
*H04W 36/32* (2009.01)

(52) U.S. Cl.
CPC ....... *H04W 36/0058* (2018.08); *H04W 36/08* (2013.01); *H04W 36/32* (2013.01)

(58) Field of Classification Search
CPC ................. G08G 1/012; G08G 1/0125; G08G 1/096775; H04W 36/00; H04W 36/12;
(Continued)

(56) References Cited

U.S. PATENT DOCUMENTS

2003/0110290 A1* 6/2003 Hiyama ................. H04L 45/30
709/233
2015/0358834 A1 12/2015 Cronin
(Continued)

FOREIGN PATENT DOCUMENTS

CN 103052144 A 4/2013
CN 106231628 A 12/2016
(Continued)

OTHER PUBLICATIONS

International Search Report issued in corresponding International Application No. PCT/CN2022/076963, mailed May 7, 2022, 5 pages.
(Continued)

*Primary Examiner* — Quoc Thai N Vu
(74) *Attorney, Agent, or Firm* — IPX PLLC

(57) ABSTRACT

This application discloses a cell data transmission method and apparatus and an electronic device. The method includes: obtaining, by an electronic device, target information, where the target information is at least one of the following: target location information or target travel information, where the target location information is used to indicate a current geographical location of the electronic device, and the target travel information is used to indicate a travel of a user of the electronic device; when the target information indicates block handover of the electronic device from a first block to a second block, sending, by the electronic device, a request message to a network device, where the request message is used to request the network device to deliver cell quality data; and receiving, by the electronic device, the cell quality data of the second block that is sent by the network device.

15 Claims, 3 Drawing Sheets

(58) Field of Classification Search
CPC . H04W 36/322; H04W 36/324; H04W 36/32; H04W 36/36; H04W 4/40; H04W 4/44; H04W 28/0226; H04W 28/0236; H04W 24/04; H04W 24/02; H04W 24/08; H04W 28/0284; H04W 36/0058; H04W 36/0085; H04W 36/06; H04W 36/08; H04W 48/20; H04W 4/029; H04L 2209/84
See application file for complete search history.

(56) References Cited

U.S. PATENT DOCUMENTS

| | | | |
|---|---|---|---|
| 2017/0105237 A1 | 4/2017 | Qian et al. | |
| 2022/0053387 A1* | 2/2022 | Lefebvre | H04W 36/0085 |
| 2023/0074288 A1* | 3/2023 | Filippou | H04L 47/127 |

FOREIGN PATENT DOCUMENTS

| | | | | |
|---|---|---|---|---|
| CN | 107371183 A | 11/2017 | | |
| CN | 108366365 A | 8/2018 | | |
| CN | 109756911 A | 5/2019 | | |
| CN | 110401973 A | 11/2019 | | |
| CN | 111629337 A | 9/2020 | | |
| CN | 112188533 A | 1/2021 | | |
| CN | 112969204 A | 6/2021 | | |
| WO | WO-2013191460 A1 * | 12/2013 | | H04W 36/04 |
| WO | 2017076146 A1 | 5/2017 | | |

OTHER PUBLICATIONS

First Office Action issued in related Chinese Patent Application No. 202110219300.9, dated Jul. 5, 2022, 6 pages.

* cited by examiner

CELL DATA TRANSMISSION METHOD AND APPARATUS AND ELECTRONIC DEVICE

CROSS-REFERENCE TO RELATED APPLICATIONS

This application is a continuation of International Application No. PCT/CN2022/076963, filed Feb. 18, 2022, which claims priority to Chinese Patent Application No. 202110219300.9, filed Feb. 26, 2021. The entire contents of each of the above-referenced applications are expressly incorporated herein by reference.

TECHNICAL FIELD

This application relates to the field of communications technologies, and specifically, relates to a cell data transmission method and apparatus and an electronic device.

BACKGROUND

With development of electronic devices, it is very common for electronic devices to connect to a network to perform various network-based operations (for example, online chat) as indicated by users.

In the related art, assuming that an electronic device is a mobile phone, generally, the mobile phone can receive signals from a plurality of different cells in a process of connecting to a mobile network for Internet access. An Internet service provider ISP can comprehensively evaluate quality of cell signals received by the mobile phone, and select a cell with best quality after the evaluation, so that the mobile phone can connect to the cell for Internet access. Further, this ensures best quality for Internet access of the mobile phone in a current situation, so that a user of the mobile phone can obtain best experience in Internet access in the current situation.

However, in some cases, after the electronic device is connected to a cell with "best signal quality" selected according to a network selection policy of the ISP, the electronic device cannot access the Internet normally, resulting in network connection failure of the electronic device.

SUMMARY

An objective of embodiments of this application is to provide a cell data transmission method and apparatus and an electronic device.

According to a first aspect, an embodiment of this application provides a cell data transmission method. The method includes: obtaining, by an electronic device, target information, where the target information is at least one of the following: target location information or target travel information, where the target location information is used to indicate a current geographical location of the electronic device, and the target travel information is used to indicate a travel of a user of the electronic device; in a case that the target information indicates block handover of the electronic device from a first block to a second block, sending, by the electronic device, a request message to a network device, where the request message is used to request the network device to deliver cell quality data of the second block, where the cell quality data is used to indicate cell signal quality, the cell quality data is data generated by the network device based on transmission quality of data information of N electronic devices, the N electronic devices are connected to cells in the second block, and N is a positive integer; and receiving, by the electronic device, the cell quality data of the second block that is sent by the network device.

According to a second aspect, an embodiment of this application provides a cell data transmission method. The method includes: receiving, by a network device, a request message sent by an electronic device, where the request message is used to request the network device to deliver cell quality data of a second block; and sending, by the network device, the cell quality data of the second block to the electronic device, where the cell quality data is used to indicate cell signal quality, where before the electronic device sends the request message, the electronic device is handed over from a first block to the second block.

According to a third aspect, an embodiment of this application provides a cell data transmission apparatus. The apparatus includes an obtaining module, a sending module, and a receiving module. The obtaining module is configured to obtain target information, where the target information is at least one of the following: target location information or target travel information, where the target location information is used to indicate a current geographical location of an electronic device, and the target travel information is used to indicate a travel of a user of the electronic device. The sending module is configured to send a request message to a network device in a case that the target information obtained by the obtaining module indicates block handover of the electronic device from a first block to a second block, where the request message is used to request the network device to deliver cell quality data of the second block, where the cell quality data is used to indicate cell signal quality, the cell quality data is data generated by the network device based on transmission quality of data information of N electronic devices, the N electronic devices are connected to cells in the second block, and N is a positive integer. The receiving module is configured to receive the cell quality data sent by the network device.

According to a fourth aspect, an embodiment of this application provides a cell data transmission apparatus. The apparatus includes a receiving module and a sending module. The receiving module is configured to receive a request message sent by an electronic device, where the request message is used to request a network device to deliver cell quality data of a second block, and the cell quality data is used to indicate cell signal quality in a changed block. The sending module is configured to send the cell quality data of the second block to the electronic device, where the cell quality data is used to indicate cell signal quality. Before the electronic device sends the request message, the electronic device is handed over from a first block to the second block.

According to a fifth aspect, an embodiment of this application provides an electronic device. The electronic device includes a processor, a memory, and a program or instruction stored in the memory and executable on the processor. When the program or instruction is executed by the processor, the steps of the method according to the first aspect are implemented.

According to a sixth aspect, an embodiment of this application provides a readable storage medium. The readable storage medium stores a program or instruction. When the program or instruction is executed by a processor, the steps of the method according to the first aspect are implemented.

According to a seventh aspect, an embodiment of this application provides a chip. The chip includes a processor and a communications interface. The communications inter-

DETAILED DESCRIPTION

Figure 1:
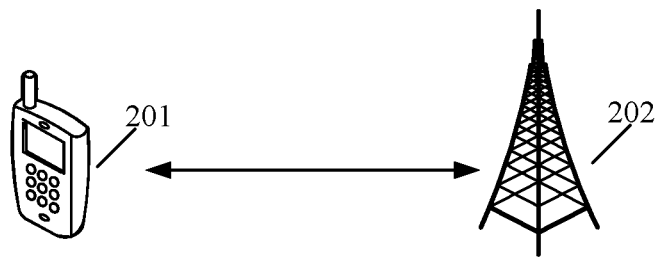
FIG. 1 is a schematic diagram of a cell data transmission system according to an embodiment of this application.

The following describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, there may be one or more first objects. In addition, in the specification and claims, "and/or" represents presence of at least one of connected objects, and the symbol "/" in this specification usually indicates an "or" relationship between associated objects.

The following explains the term "cell" that appears in the embodiments of this application.

A cell, referred to as a cellular cell, refers to an area that is covered by a base station or part of a base station (sector antenna) in a cellular mobile communications system, and within which a mobile station can reliably communicate with the base station by using a radio channel.

A cell data transmission method provided in the embodiments of this application is hereinafter described in detail by using specific embodiments and application scenarios thereof with reference to the accompanying drawings.

The cell data transmission method provided in the embodiments of this application may be applied to a scenario in which an electronic device connects to a cell in a case that the electronic device changes its geographical location or will soon change its geographical location.

For a scenario in which an electronic device connects to a cell, assuming that the electronic device is handed over from a current geographical location A to a geographical location B, the cell to which the electronic device is connected also changes, and in the geographical location B, there are N cells that the electronic device can select to connect to and whereby Internet access can be further performed. In the related art, an ISP selects a current cell with "best signal quality" for an electronic device according to a preset network selection policy, for example, a quantity of electronic devices connected to the cell and a data transmission rate in the cell; and then the electronic device connects to the cell, and then transmits network data and accesses the Internet through the cell. However, in the process, because a cell that is actually abnormal and makes the electronic device unable to access the Internet sometimes cannot be identified according to the network selection policy of the ISP, after the electronic device is connected to the cell selected by the ISP, the electronic device may be unable to access the Internet, but actually, among the N cells, there are cells that can normally allow the electronic device to access the Internet. Therefore, this manner of selecting a cell by the I and connecting to the cell has a risk of making the electronic device unable to access the Internet normally, and reduces efficiency of a user in using the electronic device for Internet access.

In the cell data transmission method provided in the embodiments of this application, an electronic device may first obtain target location information used to indicate a current geographical location of the electronic device and/or target travel information used to indicate a travel of a user of the electronic device; in a case that the target location information and/or the target travel information indicate/indicates block handover of the electronic device from a first block to a second block, the electronic device sends a request message to a network device, requesting the network device to deliver cell quality data used to indicate cell signal quality in the changed second block (the cell quality data is data generated by the network device based on transmission quality of data information of N electronic devices, the N electronic devices are connected to cells in the second block, and N is a positive integer); and finally, the electronic device receives the cell quality data sent by the network device. In this way, in a case that the geographical location of the electronic device changes, the electronic device can obtain, on a timely basis, the cell quality data of the location that is obtained by the network device based on big data. Therefore, the electronic device can obtain real and accurate cell quality information, and further connect to a cell that can effectively transmit data. This ensures network connection quality of the electronic device, and improves efficiency of the user in using the electronic device.

FIG. 1 shows a cell data transmission system provided in an embodiment of this application. The cell data transmission system includes an electronic device 201 and a network device 202. The electronic device 201 obtains target information, where the target information is at least one of the following: target location information or target travel information, where the target location information is used to indicate a current geographical location of the electronic device 201, and the target travel information is used to indicate a travel of a user of the electronic device; and in a case that the target information indicates block handover of the electronic device 201 from a first block to a second block, the electronic device 201 sends a request message to the network device 202, where the request message is used to request the network device 202 to deliver cell quality data of the second block, where the cell quality data is used to indicate cell signal quality, the cell quality data is data generated by the network device based on transmission quality of data information of N electronic devices, the N electronic devices are connected to cells in the second block, and N is a positive integer.

The network device 202 receives the request message sent by the electronic device 201, where the request message is used to request the network device 202 to deliver the cell quality data of the second block. The network device 202 sends the cell quality data of the second block to the electronic device 201, where the cell quality data is used to indicate the cell signal quality. Before the electronic device sends the request message, the electronic device is handed over from the first block to the second block.

The electronic device 201 receives the cell quality data of the second block that is sent by the network device 202.

In this way, the electronic device 201 may first obtain the target location information used to indicate the current geographical location of the electronic device and/or the target travel information used to indicate the travel of the user of the electronic device 201; in the case that the target location information and/or the target travel information indicate/indicates block handover of the electronic device 201 from the first block to the second block, the electronic device 201 sends the request message to the network device 202, requesting the network device 202 to deliver the cell quality data used to indicate the cell signal quality in the second block (the cell quality data is the data generated by the network device based on the transmission quality of data information of the N electronic devices, the N electronic devices are connected to the cells in the second block, and N is a positive integer); and finally, the electronic device 201 receives the cell quality data sent by the network device. In this way, in a case that the geographical location of the electronic device 201 changes, the electronic device 201 can obtain, on a timely basis, the cell quality data of the location that is obtained by the network device 202 based on big data. Therefore, the electronic device 201 can obtain real and accurate cell quality information, and further connect to a cell that can effectively transmit data. This ensures network connection quality of the electronic device 201, and improves efficiency of the user in using the electronic device 201.

In some embodiments, the blocks include a target road block and a city block, and the target road block is used to connect different city blocks; and that the electronic device 201 sends a request message to the network device 202 in a case that the target information indicates block handover of the electronic device 201 from a first block to a second block includes: in a case that the target information indicates block handover of the electronic device 201 from the target road block to the city block, if it is detected that location information of the electronic device 201 meets a preset condition, the electronic device 201 sends the request message to the network device 202, where the preset condition is that location information corresponding to the city block in which the electronic device is located does not change within first preset duration.

In this way, the electronic device sends, to the network device, a request message requesting to obtain cell quality data of the city block, only when detecting that the electronic device is handed over from the target road block to the city block and dwells in the city block for the first preset duration. In this way, in a case that the electronic device is only passing by the city block, the electronic device can be prevented from requesting the cell quality data of the city block, further wasting network traffic of the electronic device, and occupying storage space of the electronic device. To be specific, this solution can be used to help the electronic device save network traffic and storage space.

In some embodiments, the target information includes the target travel information, and after the electronic device 201 receives the cell quality data sent by the network device, in a case that a current first location of the electronic device 201 matches a second location, the electronic device deletes data corresponding to other locations in the cell quality data, where the other locations are locations corresponding to the travel other than the second location, and the second location is an end position of the travel.

In this way, in a case that the target information is the target travel information, cell quality data that does not need to be used can be deleted after the cell quality data is used, so that resource space of the electronic device is saved.

The electronic device sends a request message to the network device in a case that the target information indicates block handover of the electronic device from a first block to a second block in the cell data transmission method provided in this embodiment of this application may further include: in a case that the target information indicates block handover of the electronic device 201 from the first block to the second block and that dwell duration of the electronic device 201 in the second block is longer than second preset duration, the electronic device 201 sends the request message to the network device 202, and deletes data corresponding to other blocks in the cell quality data.

In this way, after the electronic device is handed over from the first block to the second block, if the dwell duration of the electronic device in the second block is longer than the second preset duration, the electronic device can determine that the user does not require cell quality data of other blocks than the second block temporarily, and therefore can delete the cell quality data of the other blocks. This helps the electronic device clear, on a timely basis, memory occupied by useless cell quality data, and improves user experience.

The cell data transmission method provided in this embodiment of this application further includes: in a case that a SIM card in the electronic device 201 is updated, the electronic device 201 sends attribute information of the updated SIM card to the network device, where the network device determines, based on the attribute information, a transmission policy for sending the cell quality data to the electronic device.

Because the electronic device sends the attribute information of the updated SIM card to the network device, the network device can flexibly adjust the policy for sending the cell quality data. Therefore, a charge for obtaining the cell quality data by the electronic device is saved for the user, and user experience is improved.

Before the network device sends the cell quality data to the electronic device, the cell data transmission method provided in this embodiment of this application further includes: the network device 202 receives data information transmitted by the N electronic devices through the cells in the second block, where N is a positive integer; and the network device 202 determines cell signal quality of the cells in the second block based on a transmission status of the data information, and generates the cell quality data of the second block.

In this way, the network device can form real and valid cell quality data of the block by continuously collecting statistics of actual use of each cell in the block by a plurality of different electronic devices in the block, and can send the valid cell quality data to the electronic device, to improve user experience of the electronic device.

Figure 2:
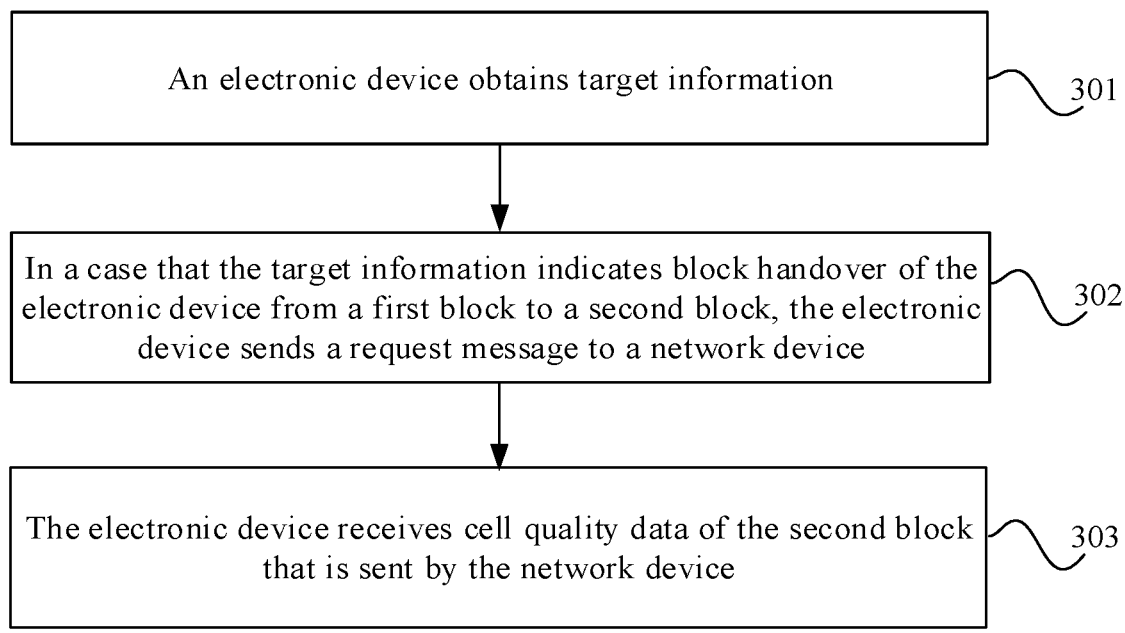
FIG. 2 is a first flowchart of a cell data transmission method according to an embodiment of this application.

This embodiment provides a cell data transmission method. As shown in FIG. 2, this embodiment is applied to an electronic device, and the cell data transmission method includes the following steps 301 to 303.

Step 301: An electronic device obtains target information.

In this embodiment of this application, the target information is at least one of the following: target location information or target travel information, where the target location information is used to indicate a current geographical location of an electronic device, and the target travel information is used to indicate a travel of a user of the electronic device.

In this embodiment of this application, the electronic device may perform continuous real-time monitoring on the target information of the electronic device, and then obtain the target information; or may perform periodic monitoring, and then obtain the target information.

In this embodiment of this application, the target location information may be information obtained by the electronic device in real time by using a positioning system in the electronic device.

In an example, the electronic device may trigger starting of a geographical information application (for example, a map application) in the electronic device to monitor and obtain the real-time location of the electronic device.

In this embodiment of this application, the target travel information may be obtained by the electronic device by obtaining travel information in the electronic device.

In an example, the electronic device may obtain information related to the travel from a travel application (for example, a map application, a tour/travel application, or a ticketing platform application), to obtain the target travel information.

Step 302: In a case that the target information indicates block handover of the electronic device from a first block to a second block, the electronic device sends a request message to a network device.

In this embodiment of this application, the request message is used to request the network device to deliver cell quality data.

In this embodiment of the application, the cell quality data is used to indicate cell signal quality, the cell quality data is data generated by the network device based on transmission quality of data information of N electronic devices, the N electronic devices are connected to cells in the second block, and N is a positive integer.

In this embodiment of this application, the network device may be a server.

In this embodiment of this application, the block may be a geographical area, and different blocks are different geographical areas.

In an example, the block may be a geographical area divided by the network device according to an administrative area, or may be a geographical area divided by the network device according to a quantity of gathered electronic devices, for example, every 100000 electronic devices correspond to one block, that is, the quantity of electronic devices in the block is less than or equal to 100000; or the block may be a geographical area divided by the network device according to a function of the block, for example, a cross-city highway area or a city area.

In this embodiment of this application, the first block and the second block are different blocks.

In this embodiment of this application, the first block and the second block may be any blocks. This is not limited in this embodiment of this application.

In this embodiment of this application, the cell quality data may be: information of cells suitable for the electronic device to connect to and use and information of cells not suitable for the electronic device to connect to and use, which are screened out by the network device according to cell signal quality of the cells in the block.

In an example, the cell quality data may indicate a cell that is most suitable for the electronic device to connect to and use in the current block and that is directly designated by the network device for the electronic device, and/or an abnormal cell that cannot be used in the current block and that is designated by the network device for the electronic device.

The following can be understood.

First, the electronic device needs to connect to the network device to transmit data. Therefore, the network device can obtain, according to data transmission processes of numerous electronic devices (that is, the N electronic devices), various types of parameter information during data transmission of the N electronic devices through a cell, such as a transmission rate and the quantity of electronic devices connected to the cell. In addition, one network device can obtain various types of parameter information in cell data transmission processes of all other network devices in a same system. In this way, no matter which block the electronic device enters, information of a cell with better quality and/or an abnormal cell in the block can be obtained through the network device, so that it is convenient for the electronic device to quickly determine a cell with good user experience in the block for connection and use in an actual application.

Example 1: After the electronic device changes from administrative block 1 to administrative area 2, the electronic device obtains information of this geographical location, and obtains real-time geographical location information of the electronic device in administrative area 2 (that is, the target location information). In this case, the electronic device may send request information to the network device, requesting the network device to send data of an abnormal cell and/or data of a cell with a top quality ranking (cell quality data) in administrative area 2 to the electronic device, and the network device contains cell data of all administrative blocks. Therefore, cell data of any one or more blocks can be sent to the electronic device.

Second, the cell signal quality may be determined by the network device comprehensively based on various types of parameter information. The parameter information may include a data transmission rate, a quantity of electronic devices connected to each cell, and the like. The electronic device may determine the cell signal quality by performing weighting calculation on different parameter information. The weighting calculation manner may be preset by the electronic device, or may be user-defined. This is not limited in this embodiment of this application.

Third, the cell quality data may indicate only data of an abnormal cell, that is, only inform the electronic device of a cell that cannot transmit data normally in any block. After receiving data of the abnormal cell, the electronic device avoids the abnormal cell and connects to another cell when selecting to connect to a cell.

Step 303: The electronic device receives the cell quality data of the second block that is sent by the network device.

Example 1: It is assumed that the block is a functional geographical area, which is divided into a city area and a cross-city highway area. The electronic device is currently connected to city A, and the electronic device periodically obtains real-time geographical location information of the electronic device by triggering the map application. In a case that the electronic device learns that the real-time geographical location information of the electronic device changes from city A (that is, the first block) to highway B (that is, the second block, the target information), the electronic device sends request information to the server (that is, the network device), requesting the server to deliver data of an abnormal cell of highway B (that is, the cell quality data). Finally, the electronic device receives the data of the abnormal cell of highway B that is sent by the server.

The abnormal cell of highway B can be understood as an abnormal cell among cells within a range along highway B. Further, the abnormal cell can be managed based on the real-time location of the user on highway B. For example, data of a cell that the user has passed through is deleted, or data of an upcoming cell is loaded in advance.

According to the cell data transmission method provided in this embodiment of this application, the electronic device may first obtain the target location information used to indicate the current geographical location of the electronic device and/or the target travel information used to indicate the travel of the user of the electronic device; in the case that the target location information and/or the target travel information indicate/indicates block handover of the electronic device from the first block to the second block, the electronic device sends the request message to the network device, requesting the network device to deliver the cell quality data of the second block (the cell quality data is the data generated by the network device based on the transmission quality of data information of the N electronic devices, the N electronic devices are connected to the cells in the second block, and N is a positive integer); and finally, the electronic device receives the cell quality data sent by the network device. In this way, in a case that the geographical location of the electronic device changes, the electronic device can obtain, on a timely basis, the cell quality data of the location that is obtained by the network device based on big data. Therefore, the electronic device can obtain real and accurate cell quality information, and further connect to a cell that can effectively transmit data. This ensures network connection quality of the electronic device, and improves efficiency of the user in using the electronic device.

In this embodiment of this application, the blocks include a target road block and a city block, and the target road block is used to connect different city blocks. On this basis, in step 302, the cell data transmission method provided in this embodiment of this application may include the following step 302a.

Step 302a: In a case that the target information indicates block handover of the electronic device from the target road block to the city block, if it is detected that location information of the electronic device meets a preset condition, the electronic device sends the request message to the network device.

For example, the preset condition is that location information corresponding to the city block in which the electronic device is located does not change within first preset duration.

For example, the target road block is a block corresponding to a specific road. Generally, the target road block can be used to connect different city blocks. For example, it is a block corresponding to location information of a railway, or a block corresponding to location information of a national road or a provincial road.

For example, the city block may be a block formed by dividing an administrative block in a general sense. For example, prefecture-level cities and cities above prefecture-level cities divided on the map are used as separate city blocks. In some embodiments, the city block may be a city block subdivided by the electronic device itself. For example, administrative areas of prefecture-level cities and cities above prefecture-level cities are used as separate city blocks. For example, district B and district C in city A may be used as two separate city blocks. In some embodiments, the city block may be a city block divided by the electronic device itself based on a usual range of movement of the user. For example, different administrative areas in prefecture-level cities and cities above prefecture-level cities are combined into separate city blocks. For example, district B and district C in city A may be combined into a single city block.

The following should be noted.

First, in the process of block division, a city block also includes a road block, but the road block is different from a target road block. A road in the city block is an ordinary highway segment, but the target road block may be used to connect different city blocks. For example, a road connecting two different prefecture-level cities may be used as a target road block.

Second, when a division range of a city block is lower than a division manner of a prefecture-level city (for example, when different administrative areas in prefecture-level cities and cities above prefecture-level cities are combined or separately used as city blocks), a road block rather than a target road block exists between city blocks.

For example, the first preset duration may be preset by the electronic device, or may be user-defined. This is not limited in this embodiment of this application.

Example 2: With reference to example 1, it is assumed that the block is a functional geographical area, which is divided into a city area (that is, the city block) and a cross-city highway area (that is, the target road block). In a case that the electronic device learns that real-time geographical location information of the electronic device changes from city A (that is, the city block) to highway B (that is, the target road block) and that the electronic device dwells on highway B for the first preset duration, the electronic device sends request information to the server (that is, the network device), requesting the server to deliver data of an abnormal cell of highway B (that is, the cell quality data). Finally, the electronic device receives the data of the abnormal cell of highway B that is sent by the server.

In this way, the electronic device sends, to the network device, a request message requesting to obtain cell quality data of the city block, only when detecting that the user is handed over from the target road block to the city block and dwells in the city block for the first preset duration. In this way, in a case that the electronic device is only passing by the city block, the electronic device can be prevented from requesting the cell quality data of the city block, further wasting network traffic of the electronic device, and occupying storage space of the electronic device. To be specific, this solution can be used to help the electronic device save network traffic and storage space.

In this embodiment of this application, after step 303, the cell data transmission method provided in this embodiment of this application further includes the following step 304.

Step 304: The electronic device is handed over between cells of the electronic device based on the cell quality data.

For example, after receiving the cell quality data, the electronic device is disconnected from a source cell based on information in the cell quality data, and connects to a cell that can normally transmit data in the block.

In an example, in a case that the cell quality data includes only an abnormal cell, the electronic device connects to any cell except the abnormal cell among all cells that the electronic device can search out.

In another example, in a case that the cell quality data includes an abnormal cell and cells with top quality rankings, the electronic device connects to any cell with a top quality ranking. The electronic device can connect to a cell with a No. 1 quality ranking.

Example 3: After receiving an abnormal cell of highway B that is sent by the server, the electronic device is disconnected from cell 1, and connects to any cell except the abnormal cell, that is, cell 2 among all cells searched out by the electronic device, and then performs data transmission through this cell.

In this way, after obtaining the cell quality data, the electronic device is handed over from the previously connected cell to a cell with acceptable quality in the current block based on the cell signal quality in the block. This ensures a normal data transmission process of the electronic device and improves efficiency of the user in using the electronic device.

In this embodiment of this application, the target information includes the target travel information, and after step 303, the cell data transmission method provided in this application further includes the following step 305.

Step 305: In a case that a current first location of the electronic device matches a second location, the electronic device deletes data corresponding to other locations in the cell quality data.

For example, the other locations are locations corresponding to the travel other than the second location, and the second location is an end position of the travel.

For example, the first location is the current real-time location of the electronic device.

For example, the location may be represented by location information.

In an example, the location information may be latitude and longitude information corresponding to the block in which the electronic device is currently located, or may be current real-time location information of the electronic device.

It can be understood that the travel information may be one-way travel information, round-trip travel information, or multi-way travel information. Generally, the electronic device can delete the data corresponding to the other locations in the cell quality data than the second location in a case of detecting completion of all travels, or can delete data of the cell in a case of detecting that cell quality data corresponding to any block in any travel is no longer required.

Example 4: It is assumed that the block is a functional geographical area, which is divided into a city area and a cross-city road area. The electronic device is currently connected to cell 1, and the electronic device periodically obtains the travel information of the electronic device by triggering the ticketing platform application. Two days after the electronic device obtains the travel information, in a case that the electronic device changes from city A to city C (that is, the target travel information), the electronic device sends request information to the server (that is, the network device), requesting the server to deliver cell quality information of all blocks from city A to city C (that is, the cell quality data), and then the electronic device receives the cell quality information of all the blocks from city A to city C that is sent by the server.

Two days later, after the electronic device completes the travel, in a case that the electronic device detects that the current city location (that is, the first location) matches the location information of city C (that is, the second location), the cell quality information of all the blocks from city A to city C is deleted.

In this way, in a case that the target information is the target travel information, cell quality data that does not need to be used can be deleted after the cell quality data is used, so that resource space of the electronic device is saved.

In this embodiment of this application, after step 302, the cell data transmission method provided in this application further includes the following step 302*b*.

Step 302*b*: In a case that the target information indicates block handover of the electronic device from the first block to the second block and that dwell duration of the electronic device in the second block is longer than second preset duration, the electronic device sends the request message to the network device, and deletes data corresponding to other blocks in the cell quality data.

For example, the second preset duration may be preset by the electronic device, or may be user-defined. This is not limited in this embodiment of this application.

Example 5: It is assumed that the block is a functional geographical area, which is divided into a city area and a cross-city highway area. The electronic device is currently connected to city A, and the electronic device periodically obtains real-time geographical location information of the electronic device by triggering the map application. In a case that the electronic device learns that the real-time geographical location information of the electronic device changes from city A (that is, the first block) to city D (that is, the second block, the target information) and that dwell duration in city D is longer than the second preset duration, the electronic device sends request information to the server (that is, the network device), requesting the server to deliver data of an abnormal cell of city D (that is, the cell quality data). Finally, the electronic device receives the data of the abnormal cell of city D that is sent by the server.

In this embodiment of this application, the cell data transmission method provided in this application further includes the following step 306.

Step 306: In a case that a subscriber identity module SIM card in the electronic device is updated, the electronic device sends the request message to the network device again.

For example, that the SIM card is updated means that the current SIM card is changed to another SIM card.

It can be understood that connecting to the cell and obtaining the cell data of different blocks are performed by the SIM card in the electronic device. When the SIM card in the electronic device is updated, the previous cell data does not exist in the updated SIM card, and the updated SIM card is unable to accurately determine cells with better quality. Therefore, after the SIM card is updated, the electronic device should send the request message to the network device again to obtain the cell quality data.

In this way, when the electronic device updates the SIM card, the electronic device automatically resends the request message to obtain the block cell information, so that the electronic device can obtain valid and high-quality cell information in time, thereby ensuring smoothness of data transmission and improving user experience.

In this embodiment of this application, the cell data transmission method provided in this application further includes the following step 307.

Step 307: In a case that the SIM card in the electronic device is updated, the electronic device sends attribute information of the updated SIM card to the network device.

For example, the network device determines, based on the attribute information, a transmission policy for sending the cell quality data to the electronic device.

For example, the attribute information is used by the network device to determine the transmission policy for sending the cell quality data to the electronic device.

For example, the attribute information may be current charge information of the SIM card. Generally, the charge information includes call duration information, call location information, traffic size information, traffic location information, and the like.

It can be understood that when the call location is an entire country or another country, charges are the same when the user uses the electronic device corresponding to the current SIM card to make a call anywhere in the country or the another country; or when the call location is a local area, a call charge when the user uses the electronic device corresponding to the current SIM card to make a call anywhere except in the local area is higher than a call charge when the user makes a call in the local area. Similarly, when the traffic location is the entire country or the another country, charges are the same when the user uses the electronic device corresponding to the current SIM card for Internet access anywhere in the country or the another country; or when the traffic location is the local area, an Internet access charge when the user uses the electronic device corresponding to the current SIM card for Internet access anywhere except in the local area is higher than an Internet access charge when the user accesses the Internet in the local area.

For example, the transmission policy may be to obtain, in the local area, the cell quality data of other blocks, or may be to obtain, in the local area or other locations than the local area, the cell quality data of other blocks.

For example, when the traffic location of the electronic device is the entire country or the another country, because the charge is a unified charge, the transmission policy may be to obtain, in the local area or other locations than the local area, the cell quality data of other blocks; or when the traffic location of the electronic device is the local area, because the charge in other areas is higher than that in the local area, the transmission policy may be to obtain, in the local area, the cell quality data of other blocks.

It should be noted that, when sending the request message to the network device for the first time, the electronic device may also send the attribute information of the SIM card in the electronic device to the network device.

Because the electronic device sends the attribute information of the updated SIM card to the network device, the network device can flexibly adjust the policy for sending the cell quality data. Therefore, a charge for obtaining the cell quality data by the electronic device is saved for the user, and user experience is improved.

Figure 3:
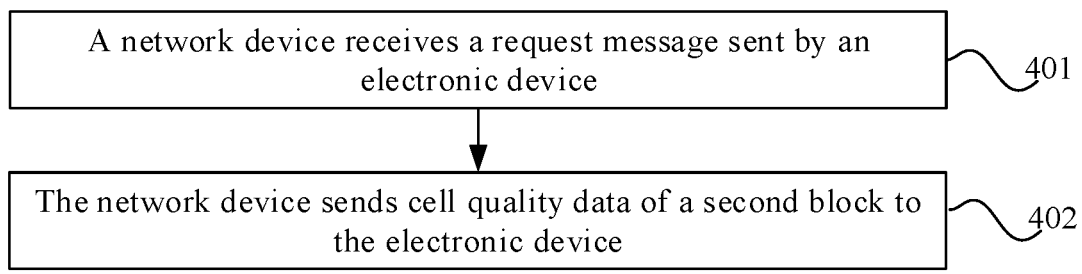
FIG. 3 is a second flowchart of a cell data transmission method according to an embodiment of this application.

This embodiment provides a cell data transmission method. As shown in FIG. 3, this embodiment is applied to a network device, and the cell data transmission method includes the following steps 401 and 402.

Step 401: A network device receives a request message sent by an electronic device.

In this embodiment of this application, the request message is used to request the network device to deliver cell quality data of a second block.

In this embodiment of this application, for the further description of the request message, the further description of the cell quality data, and the description of the block and the network device, reference may be made to the foregoing content, and details are not described herein again.

Step 402: The network device sends the cell quality data of the second block to the electronic device.

In this embodiment of this application, the cell quality data is used to indicate cell signal quality.

In this embodiment of this application, before the electronic device sends the request message, the electronic device is handed over from a first block to the second block.

In this embodiment of this application, for the description of the block, the first block, and the second block, reference may be made to the foregoing description, and details are not described herein again.

Example 6: It is assumed that the block is a functional geographical area, which is divided into a city area and a cross-city highway area. The electronic device is currently connected to city A. In a case that the network device is a server, the server receives a request message from the electronic device requesting the server to send data of an abnormal cell on highway B (that is, the cell quality data) to the electronic device, and the server sends the data of the abnormal cell on highway B to the electronic device based on previously obtained massive data information, for use by the electronic device.

According to the cell data transmission method provided in this embodiment of this application, after receiving the request message sent by the electronic device, the network device sends the cell quality data of the second block to the electronic device. Therefore, in a case that the electronic device is handed over from the first block to the second block in the geographical location, the electronic device can obtain, on a timely basis, the cell data of the location that is obtained by the network device based on big data. Therefore, the electronic device can obtain real and accurate cell quality information, and further connect to a cell that can effectively transmit data. This ensures network connection quality of the electronic device, and improves efficiency of a user in using the electronic device.

In this embodiment of this application, before step 402, the cell data transmission method provided in this application further includes the following step 403 and step 404.

Step 403: The network device receives data information transmitted by N electronic devices through cells in the second block, where N is a positive integer.

Step 404: The network device determines cell signal quality of the cells in the second block based on a transmission status of the data information, and generates the cell quality data of the second block.

For example, the N electronic devices are other devices different from the foregoing electronic device, and the N electronic devices have been connected to the cells in the second block. The network device can determine quality of the cells in the second block by obtaining the data transmission status after the N electronic devices are actually connected to the cells in the second block, and further determine quality information of the cells in the second block.

It can be understood that when the second block includes more than one cell, quality of a plurality of cells in the second block can be determined and ranked by obtaining the data transmission status after the N electronic devices are connected to different cells, so that cells with actually higher quality are recommended to the electronic device.

For example, before the network device receives a request message that is sent by the electronic device to the network device for cell quality of block A and the network device intends to send cell quality data of block A to the electronic device, the network device obtains a connection status between three electronic devices (electronic device 1, electronic device 2, and electronic device 3) and two cells (cell 1 and cell 2) in the second block, where electronic device 1 and electronic device 2 are connected to cell 1, and electronic device 3 is connected to cell 2. After the network device learns that electronic device 3 is connected to cell 2 and unable to perform data transmission, but electronic device 1 and electronic device 2 are connected to cell 1 and can smoothly perform data transmission, the network device may send cell quality information of abnormal cell 2, thereby helping the electronic device avoid connecting to the abnormal cell.

In this way, the network device can form real and valid cell quality data of the block by continuously collecting statistics of actual use of each cell in the block by a plurality of different electronic devices in the block, and can send the valid cell quality data to the electronic device, to improve user experience of the electronic device.

In this embodiment of this application, the cell data transmission method provided in this embodiment of this application further includes the following step 405.

Step 405: The network device re-receives the request message sent by the electronic device.

For example, the request message is sent in a case that a SIM card in the electronic device is updated.

In this way, in a case that the network device obtains the message that the SIM card of the electronic device is updated, the network device resends the cell quality data, to help the electronic device obtain accurate and valid cell quality information on a timely basis, and improve experience of the user in using the electronic device.

In this embodiment of this application, the cell data transmission method provided in this embodiment of this application further includes the following step 406 and step 407.

Step 406: The network device receives attribute information of the SIM card that is sent by the electronic device.

For example, the attribute information is sent in a case that the SIM card in the electronic device is updated.

Step 407: The network device determines, based on the attribute information, a transmission policy for sending the cell quality data to the electronic device.

For example, for the attribute information, reference may be made to the foregoing description, and details are not described herein again.

In this way, in a case that the network device obtains the attribute information of the electronic device, the network device chooses a most charge-saving manner to send the cell quality data to the electronic device, to help the electronic device save a network usage charge and improve experience of the user in using the electronic device.

In this embodiment of this application, before step 401, the cell data transmission method provided in this embodiment of this application further includes the following step 408 and step 409.

Step 408: The network device obtains cell data in a preset area.

Step 409: The network device divides the preset area into N blocks in a preset manner, and divides the cell data in the preset area into N pieces of cell quality data of the N blocks.

For example, the preset area may be a largest area range in which network devices in a same system are located. For example, the largest area range in which the network devices in the same system are located may be an entire country.

For example, cell data of the preset area may be all cell data in a unified system that the network device can obtain. For example, a network device may obtain nationwide cell data in the same system.

For example, the preset manner may be an area division manner preset in the electronic device, for example, a map-based area division manner, or a user-defined area division manner, for example, a manner of area division based on density of electronic devices.

In an example, a preset map may be set in the network device, and the map may include at least one of the following: division of different provinces, division of different road types, for example, highways and railways, and division of different area types. The division of different area types may be division of cities and roads connecting the cities.

For example, after the network device divides the preset area into N blocks in the preset manner, the network device may divide the cell data in the preset area into cell quality data of the N blocks.

In this way, the network device divides the blocks in the preset manner, and correspondingly generates the cell quality data of the blocks.

For effects of various implementations in this embodiment, reference may be made to the effects of the corresponding implementations in the foregoing method embodiment, and details are not described herein again to avoid repetition.

It should be noted that the cell data transmission method provided in this embodiment of this application may be performed by a cell data transmission apparatus, or a control module for performing the cell data transmission method in the cell data transmission apparatus. A cell data transmission apparatus provided in an embodiment of this application is described by assuming that the cell data transmission method in this embodiment of this application is performed by the cell data transmission apparatus.

Figure 4:
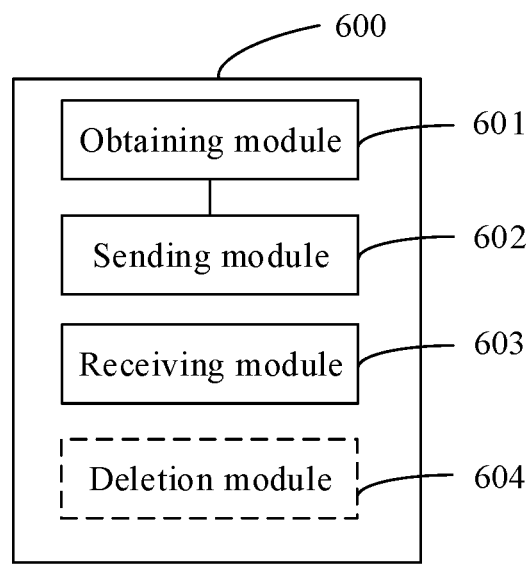
FIG. 4 is a first schematic structural diagram of a cell data transmission apparatus according to an embodiment of this application.

FIG. 4 is a possible schematic structural diagram of a cell data transmission apparatus according to an embodiment of this application. As shown in FIG. 4, the apparatus 600 includes an obtaining module 601, a sending module 602, and a receiving module 603. The obtaining module 601 is configured to obtain target information, where the target information is at least one of the following: target location information or target travel information, where the target location information is used to indicate a current geographical location of an electronic device, and the target travel information is used to indicate a travel of a user of the electronic device. The sending module 602 is configured to send a request message to a network device in a case that the target information obtained by the obtaining module 601 indicates block handover of the electronic device from a first block to a second block, where the request message is used to request the network device to deliver cell quality data of the second block, where the cell quality data is used to indicate cell signal quality, the cell quality data is data generated by the network device based on transmission quality of data information of N electronic devices, the N electronic devices are connected to cells in the second block, and N is a positive integer. The receiving module 603 is configured to receive the cell quality data of the second block that is sent by the network device.

According to the cell data transmission apparatus provided in this embodiment of this application, the cell data transmission apparatus may first obtain the target location information used to indicate the current geographical location of the electronic device and/or the target travel information used to indicate the travel of the user of the electronic device; in the case that the target location information and/or the target travel information indicate/indicates block handover of the electronic device from the first block to the second block, the cell data transmission apparatus sends the request message to the network device, requesting the network device to deliver the cell quality data used to indicate cell signal quality in the second block (the cell quality data is the data generated by the network device based on the transmission quality of data information of the N electronic devices, the N electronic devices are connected to the cells in the second block, and N is a positive integer); and finally, the cell data transmission apparatus receives the cell quality data sent by the network device. In this way, in a case that the geographical location of the cell data transmission apparatus changes, the cell data transmission apparatus can obtain, on a timely basis, the cell quality data of the location that is obtained by the network device based on big data. Therefore, the cell data transmission apparatus can obtain real and accurate cell quality information, and further connect to a cell that can effectively transmit data. This ensures network connection quality of the electronic device, and improves efficiency of the user in using the electronic device.

In this embodiment of this application, the blocks include a target road block and a city block, and the target road block is used to connect different city blocks; and the sending module 602 is configured to send the request message to the network device if it is detected that location information of the electronic device meets a preset condition in a case that the target information indicates block handover of the electronic device from the target road block to the city block, where the preset condition is that location information corresponding to the city block in which the electronic device is located does not change within first preset duration.

In this embodiment of this application, the target information includes the target travel information, and the apparatus further includes a deletion module 604, where in a case that a current first location of the electronic device matches a second location, the deletion module 604 is configured to delete data corresponding to other locations in the cell quality data, where the other locations are locations corresponding to the travel other than the second location, and the second location is an end position of the travel.

In this embodiment of this application, the apparatus 600 further includes a deletion module 604, where in a case that the target information indicates block handover of the electronic device from the first block to the second block and that dwell duration of the electronic device in the second block is longer than second preset duration, the deletion module 604 is configured to send the request message to the network device, and delete data corresponding to other blocks in the cell quality data.

In this embodiment of this application, in a case that a SIM card in the electronic device is updated, the sending module 602 is further configured to send attribute information of the updated SIM card to the network device, where the network device determines, based on the attribute information, a transmission policy for sending the cell quality data to the electronic device.

Figure 5:
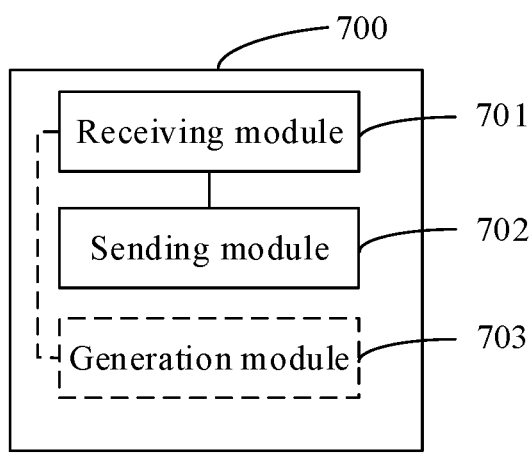
FIG. 5 is a second schematic structural diagram of a cell data transmission apparatus according to an embodiment of this application.

FIG. 5 is a possible schematic structural diagram of a cell data transmission apparatus according to an embodiment of this application. As shown in FIG. 5, the apparatus 700 includes a receiving module 701 and a sending module 702.

The receiving module 701 is configured to receive a request message sent by an electronic device, where the request message is used to request a network device to deliver cell quality data of a second block, and the cell quality data is used to indicate cell signal quality in a changed block. The sending module 702 is configured to send the cell quality data of the second block to the electronic device, where the cell quality data is used to indicate cell signal quality, where before the electronic device sends the request message, the electronic device is handed over from a first block to the second block.

According to the cell data transmission apparatus provided in this embodiment of this application, after receiving the request message sent by the electronic device, the cell data transmission apparatus sends the cell quality data of the second block to the electronic device. Therefore, in a case that the electronic device is handed over from the first block to the second block in the geographical location, the cell data transmission apparatus can obtain, on a timely basis, the cell data of the location that is obtained by the network device based on big data. Therefore, the cell data transmission apparatus can obtain real and accurate cell quality information, and further connect to a cell that can effectively transmit data. This ensures network connection quality of the electronic device, and improves efficiency of a user in using the electronic device.

In this embodiment of this application, the apparatus 700 further includes a generation module 703, where the receiving module is further configured to receive data information transmitted by N electronic devices through cells in the second block, where N is a positive integer; and the generation module 703 is configured to determine cell signal quality of the cells in the second block based on a transmission status of the data information received by the receiving module 701, and generate the cell quality data of the second block.

The cell data transmission apparatus in this embodiment of this application may be a terminal, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network attached storage (NAS), a personal computer (PC), a television (TV), a teller machine, a self-service machine, or the like. This is not specifically limited in this embodiment of this application.

The cell data transmission apparatus in this embodiment of this application may be an apparatus having an operating system. The operating system may be an Android operating system, an iOS operating system, or other possible operating systems, and is not specifically limited in this embodiment of this application.

The cell data transmission apparatus provided in this embodiment of this application is capable of implementing the processes implemented in the method embodiments in FIG. 1 and FIG. 2. To avoid repetition, details are not described herein again.

It should be noted that, as shown in FIG. 4, modules definitely included in the cell data transmission apparatus 600 are indicated by solid line boxes, such as the obtaining module 601; modules that may or may not be included in the cell data transmission apparatus 600 are indicated by dotted line boxes, such as the deletion module 604; similarly, as shown in FIG. 5, modules definitely included in the cell data transmission apparatus 700 are indicated by solid line boxes, such as the receiving module 701; and modules that may or may not be included in the cell data transmission apparatus 700 are indicated by dotted line boxes, such as the generation module 703.

Figure 6:
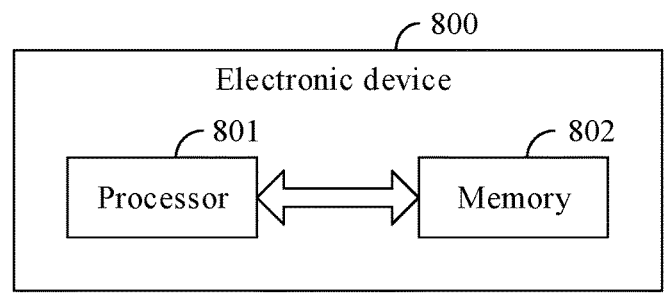
FIG. 6 is a first schematic structural diagram of an electronic device according to an embodiment of this application.

As shown in FIG. 6, an embodiment of this application further provides an electronic device 800, including a processor 801, a memory 802, and a program or instruction stored in the memory 802 and executable on the processor 801. When the program or instruction is executed by the processor 801, each process of the cell data transmission method embodiment is implemented, with the same technical effect achieved. To avoid repetition, details are not described herein again.

It should be noted that electronic devices in this embodiment of this application include the foregoing mobile electronic device and a nonmobile electronic device.

Figure 7:
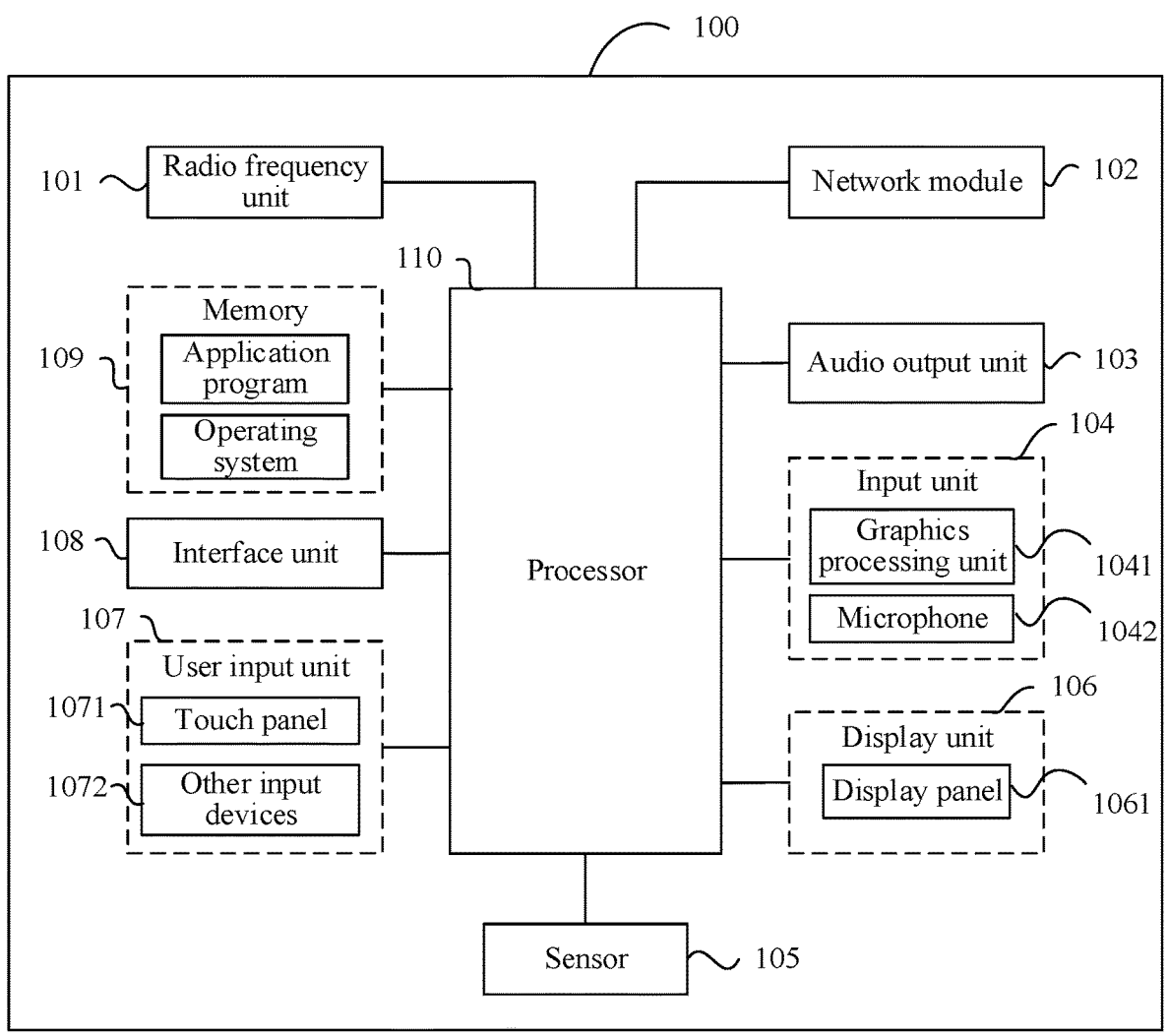
FIG. 7 is a second schematic structural diagram of an electronic device according to an embodiment of this application.

FIG. 7 is a schematic diagram of a hardware structure of an electronic device for implementing an embodiment of this application.

The electronic device 100 includes but is not limited to components such as a radio frequency unit 101, a network module 102, an audio output unit 103, an input unit 104, a sensor 105, a display unit 106, a user input unit 107, an interface unit 108, a memory 109, and a processor 110. The user input unit 107 includes a touch panel 1071 and other input devices 1072. The display unit 106 includes a display panel 1061. The input unit 104 includes an image processor 1041 and a microphone 1042. The memory 109 may be configured to store software programs (such as an operating system and applications required for at least one function) and various data.

A person skilled in the art can understand that the electronic device 100 may further include a power supply (for example, a battery) supplying power to all components, and the power supply may be logically connected to the processor 110 through a power management system. In this way, functions such as charge management, discharge management, and power consumption management are implemented by using the power management system. The structure of the electronic device shown in FIG. 7 does not constitute any limitation on the electronic device. The electronic device may include more or fewer components than shown in the figure, or a combination of some components, or the components disposed differently. Details are not described herein again.

When the electronic device 100 is an electronic device, the processor 110 is configured to obtain target information, where the target information is at least one of the following: target location information or target travel information, where the target location information is used to indicate a current geographical location of the electronic device, and the target travel information is used to indicate a travel of a user of the electronic device; the radio frequency unit 101 is configured to send a request message to a network device in a case that the target information obtained by the processor 110 indicates block handover of the electronic device from a first block to a second block, where the request message is used to request the network device to deliver cell quality data of the second block, where the cell quality data is used to indicate cell signal quality, the cell quality data is data generated by the network device based on transmission quality of data information of N electronic devices, the N electronic devices are connected to cells in the second block, and N is a positive integer; and the radio frequency unit 101 is further configured to receive the cell quality data of the second block that is sent by the network device.

According to the electronic device provided in this embodiment of this application, the electronic device may first obtain the target location information used to indicate the current geographical location of the electronic device and/or the target travel information used to indicate the travel of the user of the electronic device; in the case that the target location information and/or the target travel information indicate/indicates that the block in which the electronic device is located changes, the electronic device sends the request message to the network device, requesting the network device to deliver cell quality data used to indicate cell signal quality in the changed block; and finally, the electronic device receives the cell quality data sent by the network device. In this way, in a case that the geographical location of the electronic device changes, the electronic device can obtain, on a timely basis, the cell data of the location that is obtained by the network device based on big data. Therefore, the electronic device can obtain real and accurate cell quality information, and further connect to a cell that can effectively transmit data. This ensures network connection quality of the electronic device, and improves efficiency of the user in using the electronic device.

In some embodiments, the blocks include a target road block and a city block, and the target road block is used to connect different city blocks; and based on this, the radio frequency unit 101 is configured to send the request message to the network device if it is detected that location information of the electronic device meets a preset condition in a case that the target information obtained by the processor 110 indicates block handover of the electronic device from the target road block to the city block, where the preset condition is that location information corresponding to the city block in which the electronic device is located does not change within first preset duration.

In some embodiments, the target information includes the target travel information, and in a case that a current first location of the electronic device matches a second location, the processor 110 is further configured to delete data corresponding to other locations in the cell quality data, where the other locations are locations corresponding to the travel other than the second location, and the second location is an end position of the travel.

In some embodiments, in a case that the target information indicates block handover of the electronic device from the first block to the second block and that dwell duration of the electronic device in the second block is longer than second preset duration, the processor 110 is configured to send the request message to the network device, and delete data corresponding to other blocks in the cell quality data.

In some embodiments, in a case that a SIM card in the electronic device is updated, the radio frequency unit 101 is further configured to send attribute information of the updated SIM card to the network device, where the network device determines, based on the attribute information, a transmission policy for sending the cell quality data to the electronic device.

When the electronic device 100 is a network device, the radio frequency unit 101 is configured to receive a request message sent by an electronic device, where the request message is used to request the network device to deliver cell quality data of a second block; and the radio frequency unit 101 is further configured to send the cell quality data of the second block to the electronic device, where the cell quality data is used to indicate cell signal quality, where before the electronic device sends the request message, the electronic device is handed over from a first block to the second block.

In this embodiment, after receiving the request message sent by the electronic device, the network device sends the cell quality data of the second block to the electronic device. Therefore, in a case that the electronic device is handed over from the first block to the second block in the geographical location, the electronic device can obtain, on a timely basis, the cell data of the location that is obtained by the network device based on big data. Therefore, the electronic device can obtain real and accurate cell quality information, and further connect to a cell that can effectively transmit data. This ensures network connection quality of the electronic device, and improves efficiency of a user in using the electronic device.

In some embodiments, the radio frequency unit 101 is further configured to receive data information transmitted by N electronic devices through cells in the second block, where N is a positive integer; and the processor 110 is configured to determine cell signal quality of the cells in the second block based on a transmission status of the data information received by the radio frequency unit 101, and generate the cell quality data of the second block.

It can be understood that in this embodiment of this application, the input unit 104 may include a Graphics Processing Unit (GPU) 1041 and a microphone 1042. The graphics processing unit 1041 processes image data of a still picture or video obtained by an image capture apparatus (such as a camera) in a video capture mode or an image capture mode. The display unit 106 may include a display panel 1061, and the display panel 1061 may be configured in a form of a liquid crystal display, an organic light-emitting diode, and the like. The user input unit 107 may include a touch panel 1071 and other input devices 1072. The touch panel 1071 is also referred to as a touchscreen. The touch panel 1071 may include two parts: a touch detection apparatus and a touch controller. The other input devices 1072 may include but are not limited to a physical keyboard, a function key (such as a volume control key or a power on/off key), a trackball, a mouse, a joystick, and the like. Details are not described herein. The memory 109 may be configured to store software programs and various data, including but not limited to application programs and an operating system. The processor 110 may integrate an application processor and a modem processor, where the application processor mainly processes the operating system, user interfaces, application programs, and the like, and the modem processor mainly processes wireless communication. It can be understood that the modem processor may be not integrated in the processor 110.

An embodiment of this application further provides a readable storage medium. The readable storage medium stores a program or instruction. When the program or instruction is executed by a processor, each process of the foregoing cell data transmission method embodiment is implemented, with the same technical effect achieved. To avoid repetition, details are not described herein again.

The processor is the processor in the electronic device described in the foregoing embodiment. The readable storage medium includes a computer-readable storage medium, for example, a computer Read-Only Memory (ROM), a Random Access Memory (RAM), a magnetic disk, or an optical disc.

In addition, an embodiment of this application provides a chip. The chip includes a processor and a communications interface. The communications interface is coupled to the processor. The processor is configured to run a program or instruction to implement each process of the foregoing cell data transmission method embodiment, with the same technical effect achieved. To avoid repetition, details are not described herein again.

It should be understood that the chip provided in this embodiment of this application may also be referred to as a system-level chip, a system chip, a chip system, a system-on-chip, or the like.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and may be implemented by using hardware. Based on such an understanding, the technical solutions of the present application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A cell data transmission method, comprising:
   obtaining, by an electronic device, target information, wherein the target information is at least one of the following: target location information or target travel information, wherein the target location information is used to indicate a current geographical location of the electronic device, and the target travel information is used to indicate a travel of a user of the electronic device;
   when the target information indicates block handover of the electronic device from a first block to a second block, sending, by the electronic device, a request message to a network device, wherein the request message is used to request the network device to deliver cell quality data of the second block,
wherein the cell quality data is used to indicate cell signal quality, the cell quality data is data generated by the network device based on transmission quality of data information of N electronic devices, the N electronic devices are connected to cells in the second block, and N is a positive integer; and
receiving, by the electronic device, the cell quality data of the second block that is sent by the network device.

2. The cell data transmission method according to claim 1, wherein the blocks comprise a target road block and a city block, and the target road block is used to connect different city blocks; and
the sending, by the electronic device, the request message to the network device when the target information indicates block handover of the electronic device from the first block to the second block comprises:
when the target information indicates block handover of the electronic device from the target road block to the city block, when it is detected that location information of the electronic device meets a preset condition, sending, by the electronic device, the request message to the network device,
wherein the preset condition is that location information corresponding to the city block in which the electronic device is located does not change within first preset duration.

3. The cell data transmission method according to claim 1, wherein the target information comprises the target travel information, and after the receiving, by the electronic device, the cell quality data of the second block that is sent by the network device, the method further comprises:
when a current first location of the electronic device matches a second location, deleting, by the electronic device, data corresponding to other locations in the cell quality data,
wherein the other locations are locations corresponding to the travel other than the second location, and the second location is an end position of the travel.

4. The cell data transmission method according to claim 1, wherein the sending, by the electronic device, the request message to the network device when the target information indicates block handover of the electronic device from the first block to the second block comprises:
when the target information indicates block handover of the electronic device from the first block to the second block and that dwell duration of the electronic device in the second block is longer than second preset duration, sending, by the electronic device, the request message to the network device, and deleting data corresponding to other blocks in the cell quality data.

5. The cell data transmission method according to claim 1, further comprising:
when a SIM card in the electronic device is updated, sending, by the electronic device, attribute information of the updated SIM card to the network device,
wherein the network device determines, based on the attribute information, a transmission policy for sending the cell quality data to the electronic device.

6. An electronic device, comprising a processor, a memory, and a program or instruction stored in the memory and executable on the processor, wherein when the program or instruction is executed by the processor, performs operations comprising: obtaining target information, wherein the target information is at least one of the following: target location information or target travel information, wherein the target location information is used to indicate a current geographical location of the electronic device, and the target travel information is used to indicate a travel of a user of the electronic device;
when the target information indicates block handover of the electronic device from a first block to a second block, sending a request message to a network device, wherein the request message is used to request the network device to deliver cell quality data of the second block,
wherein the cell quality data is used to indicate cell signal quality, the cell quality data is data generated by the network device based on transmission quality of data information of N electronic devices, the N electronic devices are connected to cells in the second block, and N is a positive integer; and
receiving the cell quality data of the second block that is sent by the network device.

7. The electronic device according to claim 6, wherein the blocks comprise a target road block and a city block, and the target road block is used to connect different city blocks; and
the sending the request message to the network device when the target information indicates block handover of the electronic device from the first block to the second block comprises:
when the target information indicates block handover of the electronic device from the target road block to the city block, when it is detected that location information of the electronic device meets a preset condition, sending the request message to the network device,
wherein the preset condition is that location information corresponding to the city block in which the electronic device is located does not change within first preset duration.

8. The electronic device according to claim 6, wherein the target information comprises the target travel information, and after the receiving the cell quality data of the second block that is sent by the network device, the operations further comprise:
when a current first location of the electronic device matches a second location, deleting data corresponding to other locations in the cell quality data,
wherein the other locations are locations corresponding to the travel other than the second location, and the second location is an end position of the travel.

9. The electronic device according to claim 6, wherein the sending the request message to the network device when the target information indicates block handover of the electronic device from the first block to the second block comprises:
when the target information indicates block handover of the electronic device from the first block to the second block and that dwell duration of the electronic device in the second block is longer than second preset duration, sending the request message to the network device, and deleting data corresponding to other blocks in the cell quality data.

10. The electronic device according to claim 6, wherein the operations further comprise:
when a SIM card in the electronic device is updated, sending attribute information of the updated SIM card to the network device,
wherein the network device determines, based on the attribute information, a transmission policy for sending the cell quality data to the electronic device.

11. A non-transitory computer-readable storage medium having a program or instruction stored thereon, when the program or instruction is executed by a processor, performs operations comprising:
- obtaining, by an electronic device, target information, wherein the target information is at least one of the following: target location information or target travel information, wherein the target location information is used to indicate a current geographical location of the electronic device, and the target travel information is used to indicate a travel of a user of the electronic device;
- when the target information indicates block handover of the electronic device from a first block to a second block, sending, by the electronic device, a request message to a network device, wherein the request message is used to request the network device to deliver cell quality data of the second block,
- wherein the cell quality data is used to indicate cell signal quality, the cell quality data is data generated by the network device based on transmission quality of data information of N electronic devices, the N electronic devices are connected to cells in the second block, and N is a positive integer; and
- receiving, by the electronic device, the cell quality data of the second block that is sent by the network device.

12. The non-transitory computer-readable storage medium according to claim 11, wherein the blocks comprise a target road block and a city block, and the target road block is used to connect different city blocks; and
- the sending, by the electronic device, the request message to the network device when the target information indicates block handover of the electronic device from the first block to the second block comprises:
- when the target information indicates block handover of the electronic device from the target road block to the city block, when it is detected that location information of the electronic device meets a preset condition, sending, by the electronic device, the request message to the network device,
- wherein the preset condition is that location information corresponding to the city block in which the electronic device is located does not change within first preset duration.

13. The non-transitory computer-readable storage medium according to claim 11, wherein the target information comprises the target travel information, and after the receiving, by the electronic device, the cell quality data of the second block that is sent by the network device, the operations further comprise:
- when a current first location of the electronic device matches a second location, deleting, by the electronic device, data corresponding to other locations in the cell quality data,
- wherein the other locations are locations corresponding to the travel other than the second location, and the second location is an end position of the travel.

14. The non-transitory computer-readable storage medium according to claim 11, wherein the sending, by the electronic device, the request message to the network device when the target information indicates block handover of the electronic device from the first block to the second block comprises:
- when the target information indicates block handover of the electronic device from the first block to the second block and that dwell duration of the electronic device in the second block is longer than second preset duration, sending, by the electronic device, the request message to the network device, and deleting data corresponding to other blocks in the cell quality data.

15. The non-transitory computer-readable storage medium according to claim 11, wherein the operations further comprise:
- when a SIM card in the electronic device is updated, sending, by the electronic device, attribute information of the updated SIM card to the network device,
- wherein the network device determines, based on the attribute information, a transmission policy for sending the cell quality data to the electronic device.

* * * * *